No. 897,565. PATENTED SEPT. 1, 1908.
C. WALKER.
ROPE HALTER.
APPLICATION FILED OCT. 17, 1907.
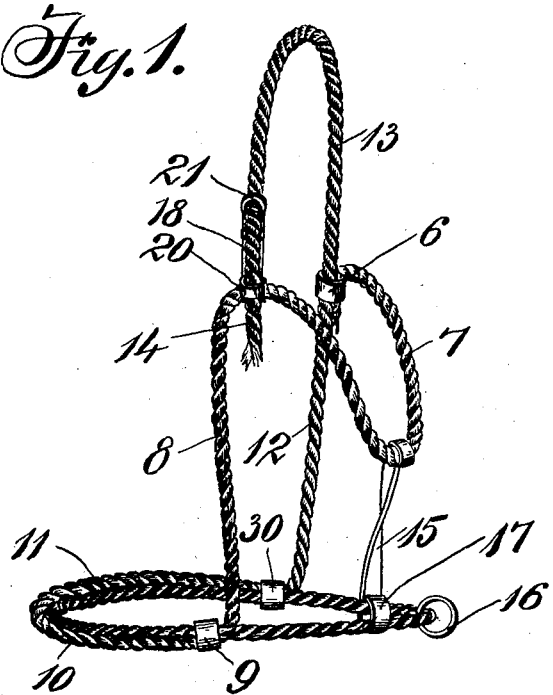
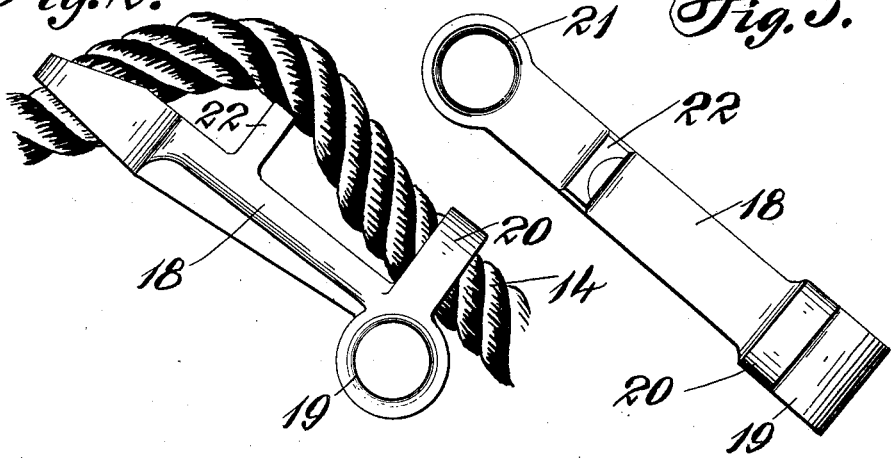

UNITED STATES PATENT OFFICE.

CHARLES WALKER, OF CHICAGO, ILLINOIS.

ROPE HALTER.

No. 897,565.     Specification of Letters Patent.     Patented Sept. 1, 1908.

Application filed October 17, 1907. Serial No. 397,886.

*To all whom it may concern:*

Be it known that I, CHARLES WALKER, a citizen of the United States, residing at Chicago, in the county of Cook and State of Illinois, have invented certain new and useful Improvements in Rope Halters, of which the following is a specification.

This invention relates to rope halters, and includes a novel form of clamp or holder for the purpose of holding the free end of the rope, which is adjustable in the clamp to form a halter of any desired size.

The invention is illustrated in the accompanying drawings, in which

Figure 1 is a perspective view of the complete halter. Figs. 2 and 3 are details showing side and front views of the holder which fastens the rope.

The halter consists of or is formed with a single piece of rope. This is fastened at one end by a clip 6 and is thence formed in a loop 7 which extends under the throat of the animal, and continues through a tubular part of the holder to be hereinafter described, from which it passes down to form a cheek piece 8. Thence the rope passes through a ring 9 and is looped around at 10 to form a nose-ring, extending thence through a ring 30 on the other side and thence around again through the rings 9 and 30 to form a double loop at the front as indicated at 11, and from the ring 30 it extends upwardly to form a cheek piece 12 on the side opposite the piece 8, extending thence through the clip 6 and up and over to form a crown loop 13, the free end 14 being fastened in the holder heretofore referred to. A throat strap 15 is connected between the loop 7 and the rear part of the nose-ring, and the latter is also provided with a ring 16 for the attachment of a hitching strap or the like. The loop 17 at the lower end of the throat strap 15 incloses both strands of the nose-ring, and said loop 17 may be slid in or out to vary the size of the nose-ring or loop to fit the animal on which the halter is placed. The holder or clamp referred to consists of a bar 18 having at its lower end a tube 19 arranged at a right angle to the length of the bar. Said bar also has at its lower end a ring 20 standing out forwardly or laterally from the bar, and at its upper end it has a ring 21 located in the plane of the bar, and between said rings it has a laterally projecting stud or rib 22. The part of the rope between the throat loop 7 and the cheek piece 8 extends through the tube 19, at a snug fit, and the free end 14 of the rope extends downwardly through the rings 21 and 20 and is bent over the lug 22, the bend forming a clamp or holder which prevents the free end of the rope from slipping when it is drawn tight.

Various adjustments of the rope are possible to alter the size or shape of the halter. The clip 6 is fast, but the rings 9 and 30 hold the ropes at only a snug fit, and consequently by special effort said rings may be slipped along the rope to vary the length of the halter. The free end 14 of the rope can be adjusted in the holder to lengthen or shorten the crown loop, and the rope may also be pulled one way or the other through the tube 19 to vary the size of the throat-loop. Ordinarily, however, the adjustment permitted by the holder at the free end of the rope will be all that is necessary to adapt the halter to various animals.

I claim:

1. A halter comprising a rope bent to form loops to extend around the throat and nose of the animal, and a holder for the free end of the rope consisting of a bar having rings at opposite ends through which the rope is bent and a transverse tube through which the rope extends at one end of the throat loop.

2. In a rope halter, a fastening for the rope consisting of a bar having rings at opposite ends through which the rope extends, the ring at one end being in the same plane as the bar and that at the other end projecting from the side of the bar, the bar having an intermediate lug over which the rope is bent, and also having an integral transverse tube through which the rope passes, on the side of the bar opposite said projecting ring.

3. A halter comprising a single piece of rope bent to form in succession a single throat loop, a cheek piece extending down one side, a continuous nose loop, a cheek piece extending up the other side, a single crown loop, connections between the crown loop and the cheek pieces and throat loop, one of which connections is adjustable, and connecting rings between the cheek pieces and the nose loop.

In testimony whereof I affix my signature, in presence of two witnesses.

CHARLES WALKER.

Witnesses:
FLORENCE HENDERSON,
H. G. BATCHELOR.